United States Patent
Brockway

(10) Patent No.: US 7,354,050 B2
(45) Date of Patent: Apr. 8, 2008

(54) SWING-AWAY STAIR ASSEMBLY

(75) Inventor: Robert John Brockway, Plymouth, WI (US)

(73) Assignee: Terra Compactor Wheel Corp., Sheboygan, WI (US)

( * ) Notice: Subject to any disclaimer, the term of this patent is extended or adjusted under 35 U.S.C. 154(b) by 285 days.

(21) Appl. No.: 11/180,473

(22) Filed: Jul. 13, 2005

(65) Prior Publication Data
US 2005/0263976 A1 Dec. 1, 2005

Related U.S. Application Data

(63) Continuation of application No. 10/455,828, filed on Jun. 6, 2003, now abandoned.

(60) Provisional application No. 60/388,786, filed on Jun. 14, 2002.

(51) Int. Cl.
B60R 3/00 (2006.01)

(52) U.S. Cl. .................... 280/66; 280/63; 182/127

(58) Field of Classification Search .............. 280/163, 280/166; 182/97, 98, 38, 39, 127, 129, 15, 182/104, 83, 84, 92
See application file for complete search history.

(56) References Cited

U.S. PATENT DOCUMENTS

| 2,999,556 | A |   | 9/1961  | Horne et al. |        |
|-----------|---|---|---------|--------------|--------|
| 3,190,392 | A |   | 6/1965  | Ashton et al.|        |
| 3,232,376 | A | * | 2/1966  | Lucas et al. | 182/97 |
| 3,313,374 | A | * | 4/1967  | Teach        | 182/89 |
| 3,656,578 | A |   | 4/1972  | Hemken       |        |
| 3,997,183 | A |   | 12/1976 | Russey       |        |
| 4,013,136 | A | * | 3/1977  | Fear         | 180/68.5 |
| 4,339,016 | A |   | 7/1982  | Gerresheim   |        |
| 4,480,710 | A | * | 11/1984 | Hansen       | 180/68.5 |
| 4,971,168 | A |   | 11/1990 | Stanescu     |        |
| 5,046,582 | A | * | 9/1991  | Albrecht     | 182/127 |
| 5,117,940 | A | * | 6/1992  | Garelick     | 182/97 |
| 5,358,355 | A |   | 10/1994 | Brockway     |        |

(Continued)

Primary Examiner—Christopher P. Ellis
Assistant Examiner—Vaughn T Coolman
(74) Attorney, Agent, or Firm—Ziolkowski Patent Solutions Group, SC

(57) ABSTRACT

The present invention provides a swing-away stair assembly including a pivot bracket assembly for supporting a stair body for pivotal movement on a work machine, such as a landfill compactor. The pivot bracket assembly includes a stair support sub-assembly having an attachment portion for attaching to the stair body and a pivot portion spaced from the attachment portion. The pivot bracket assembly further includes a pivot mount sub-assembly for attaching the swing-away assembly to the lateral side of the machine, the pivot mount sub-assembly including a mounting portion for attaching to the lateral side of the machine and a pivot portion spaced from the mounting portion. A hinge member cooperates with the stair support sub-assembly and the pivot mount sub-assembly whereby the stair support sub-assembly is supported for pivotal movement relative to the pivot mount sub-assembly for supporting the stair for pivotal movement relative to the lateral side of the machine. The hinge member provides a pivot axis for the stair body which is located laterally outwardly from the lateral side of the work machine whereby the stair body is supported for movement around a rear wheel of the work machine, and is capable of 180° of pivotal movement between an operational position extending over the rear wheel and an access position displaced from the rear wheel.

20 Claims, 4 Drawing Sheets

U.S. PATENT DOCUMENTS

| | | |
|---|---|---|
| D379,630 S | 6/1997 | Brockway |
| 5,653,307 A | 8/1997 | Kerr |
| 5,676,493 A | 10/1997 | Brockway |
| 5,769,507 A | 6/1998 | Brockway |
| 5,813,494 A * | 9/1998 | Ulschmid et al. ............. 182/97 |
| 5,984,037 A | 11/1999 | Duhem |
| 5,988,316 A | 11/1999 | Hedley |
| 5,996,737 A | 12/1999 | Hedley et al. |
| 6,029,775 A | 2/2000 | Hedley et al. |
| 6,042,192 A | 3/2000 | Brockway |
| 6,230,841 B1 | 5/2001 | Valore |
| 6,264,222 B1 | 7/2001 | Johnston et al. |
| 6,273,516 B1 | 8/2001 | Brockway |
| 6,817,433 B1 * | 11/2004 | Bergstrom et al. ....... 180/89.12 |
| 6,913,289 B2 | 7/2005 | Brockway |

* cited by examiner

SWING-AWAY STAIR ASSEMBLY

CROSS REFERENCE TO RELATED APPLICATION

This application is a continuation of application Ser. No. 10/455,828 filed Jun. 6, 2003, which claims the benefit of U.S. Provisional Application No. 60/388,786 filed Jun. 14, 2002, both of which are incorporated herein by reference.

BACKGROUND OF THE INVENTION

1. Field of the Invention

The present invention relates to a pivoting stair assembly for a work machine. In particular, the invention comprises a pivot structure for supporting a stair assembly for pivoting movement on a landfill compacting tractor.

2. Description of Related Prior Art

Many work machines, such as heavy compacting machines, include stair assemblies located along one or both lateral sides of the machine to facilitate an equipment operator accessing the cab of the machine. In addition, it is known to locate such stair assemblies over at least one of the wheels of the machine in order to further act as a fender to limit travel of debris flung up by the wheels. The stair assemblies are often located adjacent to removable access panels in the lateral sides of the machine, requiring removal of the stair assembly from the side of the machine, and in the case of compacting machines, removal of an associated wheel to access the access panels. The Caterpillar model 386 compactor is one known compacting machine, including steel wheels which weigh up to 10,000 pounds, such that it is necessary to first remove the stair assembly from the area of the wheel in order to attach lifting equipment, such as a crane, to the wheel for lifting the wheel away from the machine.

One known solution to facilitate servicing of the work machine is the provision of a pivot for the stair assembly which enables the stair assembly to be partially pivoted away from the side of the work machine. The known structure places the pivot inwardly from the outer edge of a deck or platform located adjacent to the cab for the machine. The pivot permits the stair assembly to move only about 90° from its operational position over the wheel to an open or access position spaced from the machine. The access position for the stair assembly locates the stair assembly generally over the longitudinal axis of the wheel, such that it is necessary for the lift equipment to work around the stair assembly, including moving the stair assembly to different positions, during the process of removing the wheel. Specifically, the wheel removal process requires that the wheel be moved partially outwardly from the machine after the stair assembly has been pivoted to its access position, and the stair assembly must subsequently be moved to its operable position adjacent the machine before reattaching the lift equipment to the wheel and performing the final operation of lifting the wheel away from the machine.

A further drawback associated with the above described pivoted stair assembly is that the machine requires a large work space to accommodate pivoting of the stair assembly within the service area. Also, if it is desired to move the machine through the service area doorway with the stair assembly located in the access position, most service area doorways would not be capable of accommodating the large width formed by the stair assembly when in the 90° access position.

Accordingly, there remains a need for a stair assembly on a work machine, including an associated pivot structure, which facilitates movement of the stair assembly from its operational position to an access position. Additionally, there is a need for such a stair assembly which positions the stair assembly in a relatively compact location adjacent the machine and which provides substantially unimpeded access to a wheel of the machine.

SUMMARY OF THE INVENTION

The present invention provides a swing-away stair assembly including a pivot bracket assembly for supporting a stair body for pivotal movement on a work machine, such as a landfill compactor. The pivot bracket assembly provides a pivot axis for the stair body which is located laterally outwardly from a lateral side of the work machine whereby the stair body is supported for movement around a rear wheel of the work machine, and is capable of 180° of pivotal movement between an operational position extending over the rear wheel and an access position displaced from the rear wheel.

In accordance with one aspect to the invention, a swing-away stair assembly is provided adapted to be coupled to a work machine, the stair assembly comprising a movable stair body located adjacent a lateral side of a work machine, and including a step portion comprising a plurality of steps extending from a lower end to an upper end of the step portion; a stair support sub-assembly rigidly attached to the movable stair body; a pivot mount sub-assembly rigidly attached adjacent the lateral side of the machine; a hinge member connecting the stair support sub-assembly to the pivot mount sub-assembly for pivotal movement about a pivot axis whereby the moveable stair body is pivotally movable from an operational position to an access position; and wherein the stair body extends substantially parallel to the lateral side when the stair body is in both the operational position and the access position.

In accordance with a further aspect of the invention, a swing-away assembly is provided adapted to be coupled to a work machine, the assembly comprising a stair support sub-assembly including an attachment portion for attaching to a stair and a pivot portion spaced from the attachment portion; a pivot mount sub-assembly including a mounting portion for attaching to a lateral side of the machine and a pivot portion spaced from the mounting portion; and a hinge member cooperating with the stair support sub-assembly and the pivot mount sub-assembly whereby the stair support sub-assembly is supported for pivotal movement relative to the pivot mount sub-assembly for supporting the stair for pivotal movement relative to the lateral side of the machine.

In accordance with yet another aspect of the invention, a swing-away stair assembly is provided adapted to be coupled to a work machine, the assembly comprising a movable stair body located adjacent a lateral side of a work machine; a stair support sub-assembly including an attachment portion for attaching to the stair body and a pivot portion spaced from the attachment portion; a pivot mount sub-assembly for attaching the stair assembly to the lateral side of the machine, the pivot mount sub-assembly including a mounting plate for attaching to the lateral side of the machine for extending laterally outwardly from the lateral side, and a hinge plate extending from the mounting plate; and a hinge member cooperating with the pivot portion and with the hinge plate for connecting the stair support sub-assembly to the pivot mount sub-assembly whereby the stair body is pivotally movable about a pivot axis from an operational position to an access position.

Other features and advantages of the invention will be apparent from the following description, the accompanying drawings and the appended claims.

DETAILED DESCRIPTION OF THE PREFERRED EMBODIMENT

Figure 1:
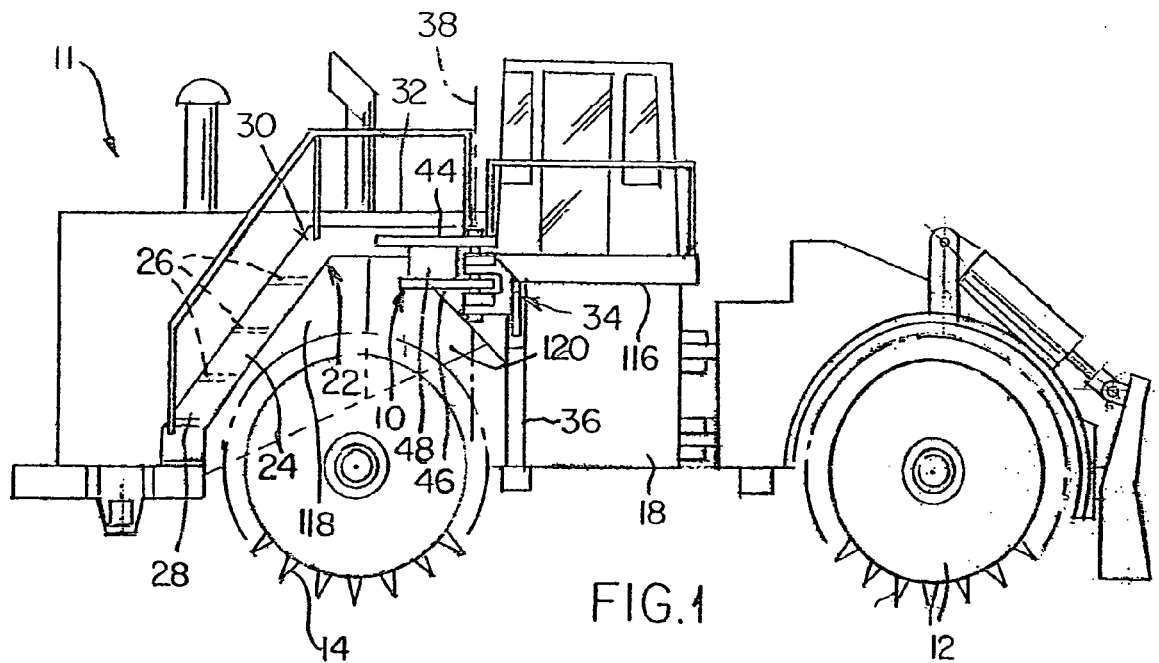
FIG. 1 is a side elevational view of a work machine including the stair assembly of the present application, and illustrating the stair assembly in an operational position.
Figure 2:
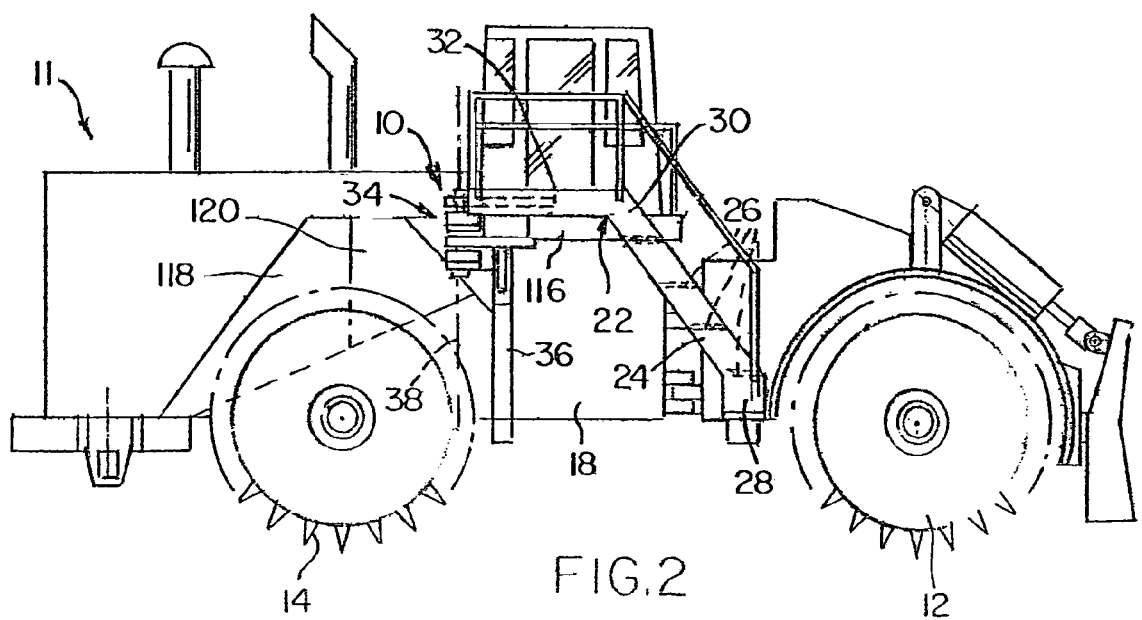
FIG. 2 is a side elevational view of the work machine illustrating the stair assembly in an access position.
Figure 3:
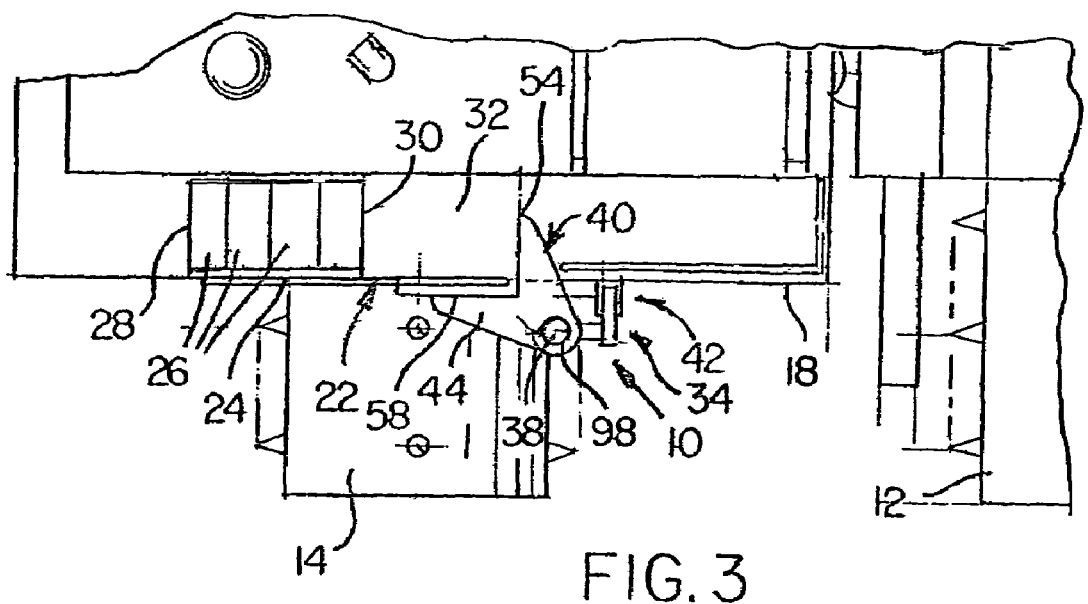
FIG. 3 is a plan view of the work machine illustrating the stair assembly located in the operational position.

Referring to FIGS. 1-3, the invention of the present application comprises a stair assembly 10 for use with a work machine 11, such as a landfill compactor. The illustrated work machine 11 includes front and rear wheels 12, 14 adjacent a lateral side 18 of the machine 11.

Figure 4:
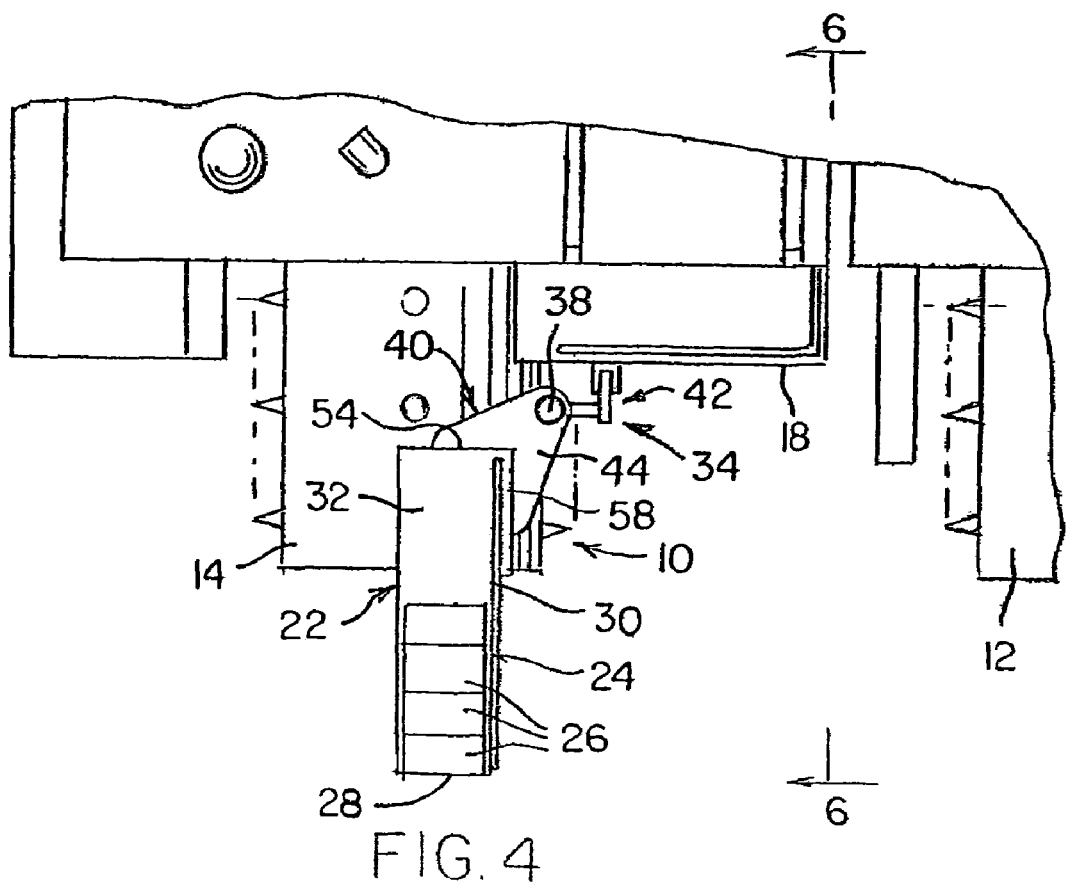
FIG. 4 is a plan view of a right side portion of the work machine illustrating the stair assembly pivoted to a 90° position.
Figure 5:
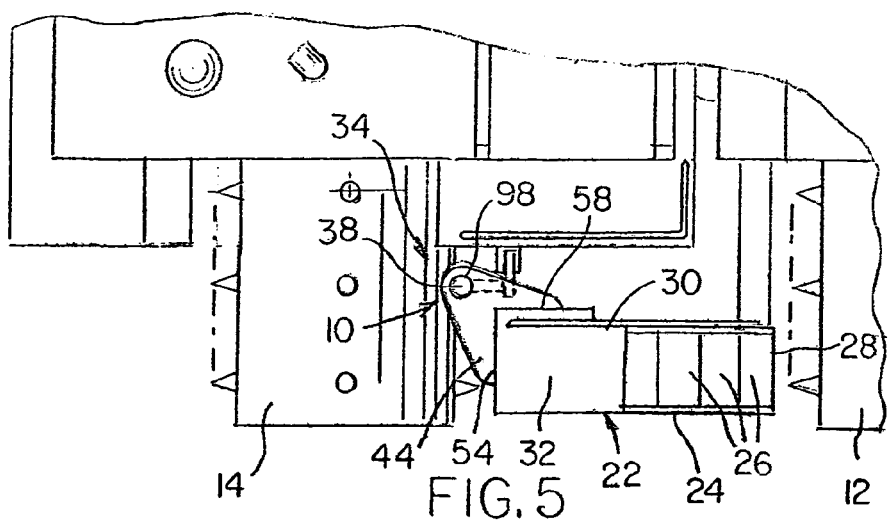
FIG. 5 is plan view of a right side portion of the work machine illustrating the stair assembly in the access position.
Figure 6:
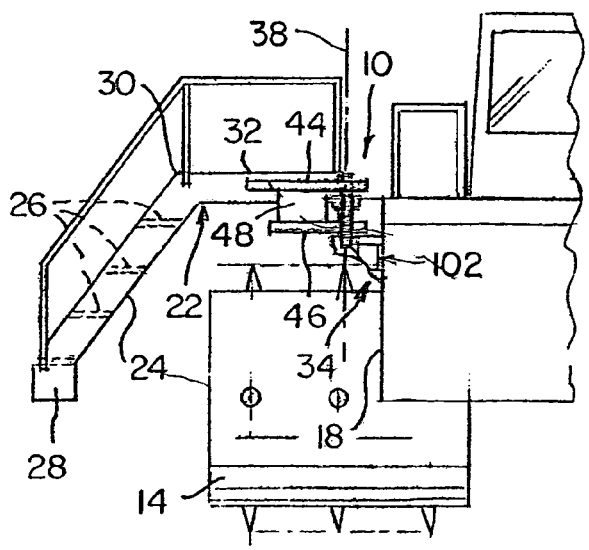
FIG. 6 is a front elevational view of the work machine taken along line 6-6 in FIG. 4.

Referring further to FIGS. 4-6, the stair assembly 10 for use with the machine 1 1 comprises a stair body 22 having a step portion 24 including a plurality of steps 26 extending from a lower end 28 to an upper end 30 of the step portion 24. The step portion 24 extends longitudinally upwardly along an elongated direction of the stair body 22. The stair body 22 also includes a substantially horizontal pivot deck portion 32 located at the upper end 30 of the step portion 24. The stair assembly 10 further comprises a pivot bracket assembly 34 which is attached to a frame or main support member 36 at the lateral side 18 for mounting the stair body 22 for movement relative to the lateral side 18. The pivot bracket assembly 34 supports the stair body 22 for pivotal movement about a pivot axis 38, enabling the stair body 22 to pivot from a rearwardly extending operational position, where the stair body 22 extends over the rear wheel 14 (FIG. 1), to a forwardly extending open or access position where the stair body 22 is positioned clear of the rear wheel 14 (FIG. 2).

Figures 7, 8:
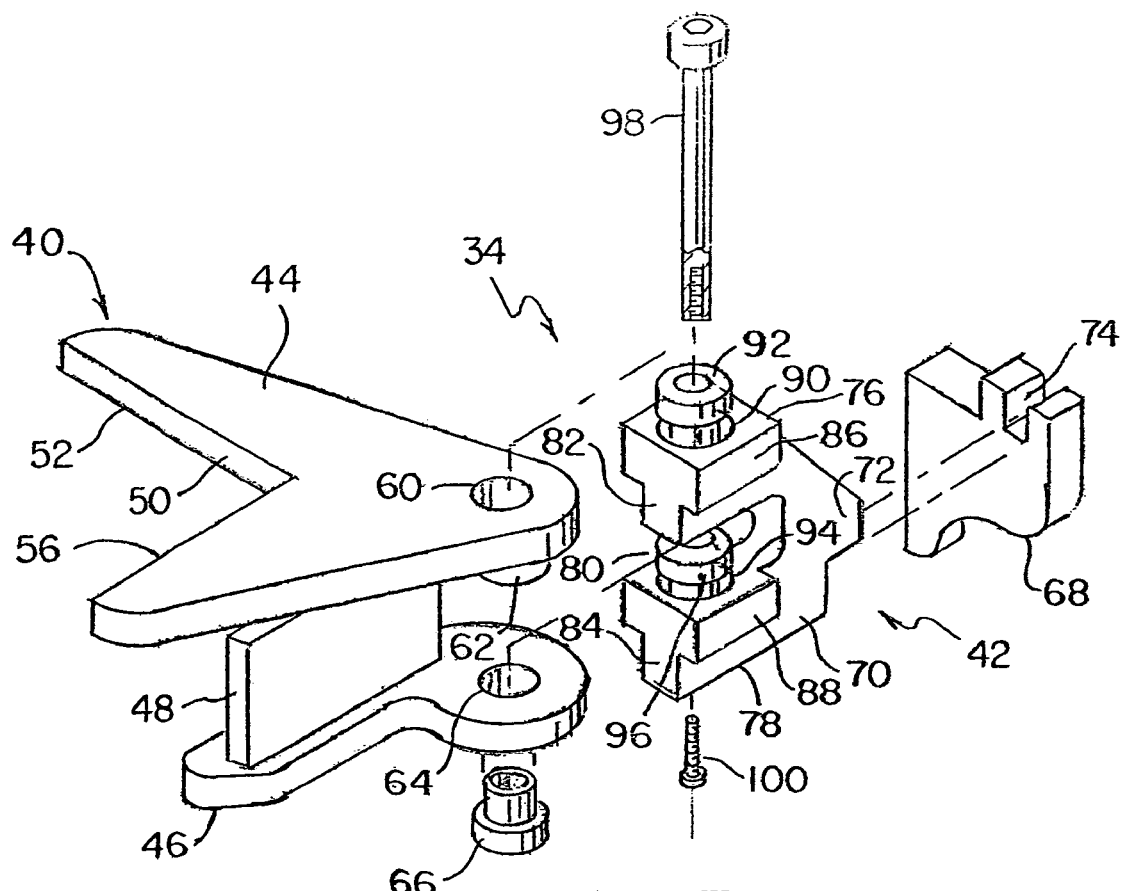
FIG. 7 is an exploded perspective view of a pivot bracket assembly for supporting the stair assembly to the work machine.
FIG. 8 is a partial cross-sectional view of the pivot bracket assembly.

Referring to FIGS. 7 and 8, the pivot bracket assembly 34 comprises a stair support sub-assembly 40 and a pivot mount sub-assembly 42. The stair support sub-assembly 40 includes an upper plate 44 and a lower plate 46, and a spacer plate 48 attached to and extending between the upper and lower plates 44, 46. The upper plate 44 includes an aperture 60 receiving a bushing 62, and the lower plate 46 includes an aperture 64 axially aligned with the aperture 60 in the upper plate 44 and receiving a bushing 66.

The upper plate 44 is formed with a right angle notch 50 including a first surface 52 for attaching to a forward facing surface 54 (FIGS. 3-5) of the stair body 22 and a second surface 56 attaching to an outer surface 58 (FIGS. 3-5) of the stair body 22. The first and second surfaces 52, 56 define an attachment portion for attaching to the forwardly facing surface 54 and outer surface 58, respectively, by any conventional means including bolting, welding, or other attachment mechanism of sufficient strength to support the stair body 22 from the pivot bracket assembly 34.

The pivot mount sub-assembly 42 includes a mounting plate 68 supporting a hinge plate 70 wherein the hinge plate 70 includes tongue portion 72 engaging within a notch 74 in the mounting plate 68. The hinge plate 70 includes opposing upper and lower edges 76, 78, and a horizontal slot 80 extends inwardly from a side edge of the hinge plate 70 between the upper and lower edges 76, 78 and defines upper and lower legs 82, 84 of the hinge plate 70. The upper leg 82 includes an enlarged upper block 86, and the lower leg 84 includes an enlarged lower block 88. An upper aperture 90 is formed through the upper block 86, and a bushing 92 is located in the upper aperture 90. The lower block 88 is formed with a lower aperture 94 axially aligned with the aperture 90 in the upper block 86, and a bushing 96 is located in the lower aperture 94.

The stair support sub-assembly 40 is assembled to the pivot mount sub-assembly 42 by positioning the upper plate 44 over the upper block 86 of the hinge plate 70 and positioning the lower plate 46 within the horizontal slot 80 over the lower block 88, whereby the bushings 62, 66 of the upper and lower plates 44, 46 are aligned with and engage the bushings 92, 96, respectively, of the upper and lower legs 82, 84 of the hinge plate 70. A pin 98 extends through the upper and lower plates 44, 46 and the upper and lower legs 82, 84 to form a hinge element defining the pivot axis 38 and connecting the stair support sub-assembly 40 for pivotal movement relative to the pivot mount sub-assembly 42 at a hinge portion of the pivot bracket assembly 34. Additionally, a bolt 100 extends upwardly through the bottom of the lower leg 84 and into engagement with the bottom of the pin 98 to hold in pin 98 in place.

It should be noted that the bushings 62, 66, 92, 96 are bronze bushings and are preferably Ampco bronze bushings (produced by Ampco Metal Incorporated of Milwaukee, Wis.), which comprise a hard material having a lubricant blended within its matrix, and thus does not require lubrication after initial installation.

Figure 9:
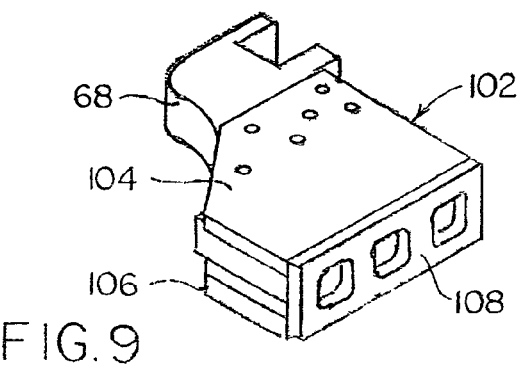
FIG. 9 is a perspective view of a mounting bracket of the pivot bracket assembly.

Referring to FIG. 9, a construction for facilitating mounting of the pivot bracket assembly 34 to the machine 11 is illustrated. The illustrated mounting construction includes a mounting bracket 102 comprising a pair of side walls 104, 106 which are located in spaced relation to each other and which are attached to a base plate 108. The mounting plate 68 of the pivot mount sub-assembly 42 is received between and is rigidly attached to the side walls 104, 106 by means of fasteners, such as by bolts.

It should be noted that the pivot axis 38 defined by the pin 98 is located between the front and rear wheels 12, 14 and is positioned laterally outwardly from the lateral side 18 of the machine 11, and thereby provides a swing arc for the stair body 22 as it is pivoted to the access position. Further, due to the position of the pivot axis 38 laterally outwardly from the side 18, the stair body 22 is capable of pivoting through 180 degrees to position the stair body 22 extending forwardly parallel the side 18 of the machine 11 with the outer surface 58 of the stair body 22 facing toward an outer side 116 of the fixed deck 20 (FIG. 1). When positioned in the access position, the stair body 22 is located between the front and rear wheels 12, 14, as seen in FIGS. 2 and 5.

The pivot configuration provided by the present invention permits the stair body 22 to be pivoted away from the machine 11 without requiring removal of the rear wheel 14 whereby a worker may readily access panels adjacent to the rear wheel 14, and in particular, for accessing an oil change panel 118 and torque converter panel 120. By providing 180° pivotal movement for the stair body 22 to the access position, the stair body 22 is further compactly positioned adjacent to the machine 11 to permit the machine 11 to pass through the doorway of a work area for servicing of the machine 11.

It should be understood that the pivot bracket assembly 34 disclosed herein may be provided as a kit to convert a stair assembly, provided as a standard bolted on structure, to a pivoted stair assembly.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A swing-away stair assembly adapted to be coupled to a work machine, said stair assembly comprising:
    a movable stair body located adjacent a lateral side of a work machine, and including a step portion comprising a plurality of steps extending from a lower end to an upper end of said step portion;
    a stair support sub-assembly rigidly attached to said movable stair body;
    a pivot mount sub-assembly rigidly attached adjacent said lateral side of said machine;
    a hinge member connecting said stair support sub-assembly to said pivot mount sub-assembly for pivotal movement about a substantially vertically extending pivot axis whereby said moveable stair body is pivotally movable about said vertically extending pivot axis through an arc of movement greater than 120° from a first position to a second position; and
    wherein said stair body extends substantially parallel to said lateral side when said stair body is in both said first position and said second position.

2. The stair assembly of claim 1 wherein said stair body is pivotally movable through approximately 180° of movement relative to said lateral side.

3. The stair assembly of claim 1 wherein said stair body includes an outer side facing away from said lateral side when said stair body is in said first position, and said pivot mount sub-assembly is located adjacent to said outer side of said stair body.

4. The stair assembly of claim 1 wherein said stair body further includes a substantially horizontal pivot deck portion located at said upper end of said step portion, and said stair support sub-assembly is attached to said pivot deck portion.

5. The stair assembly of claim 1 wherein said pivot axis is located between front and rear wheels of said machine and said stair body extends over said rear wheel of said machine when said stair body is in said first position.

6. The stair assembly of claim 1 wherein said pivot mount sub-assembly comprises a hinge plate defining upper and lower legs, and said stair support sub-assembly comprises an upper plate and a lower plate, said upper plate pivoting above said upper leg and said lower plate pivoting between said upper and lower legs.

7. The stair assembly of claim 6 wherein said hinge member comprises a pin extending vertically through said upper and lower legs and through said upper and lower plates.

8. A swing-away assembly adapted to be coupled to a work machine, said assembly comprising:
    a movable stair body;
    a stair support sub-assembly including an attachment portion for attaching to said movable stair body and a pivot portion spaced from said attachment portion;
    a pivot mount sub-assembly including a mounting portion for attaching to a lateral side of the machine and a pivot member spaced from said mounting portion; and
    a substantially vertically extending pin defining a hinge member cooperating with said stair support sub-assembly and said pivot mount sub-assembly whereby said stair support sub-assembly is supported for pivotal movement relative to said pivot mount sub-assembly for supporting said stair body for pivotal movement through an arc of movement greater than 120° about a substantially vertical axis relative to said lateral side of the machine.

9. The assembly of claim 8 wherein said stair support sub-assembly is pivotally movable through approximately 180° of movement relative to said pivot mount sub-assembly.

10. The assembly of claim 8 wherein said stair support sub-assembly comprises an upper plate and a lower plate oriented substantially parallel to each other and cooperating with said hinge member, said upper plate defining said attachment portion.

11. The assembly of claim 10 including a spacer plate rigidly attached between said upper and lower plates and supporting said lower plate in spaced relation to said upper plate.

12. The assembly of claim 11 wherein said pivot mount sub-assembly comprises upper and lower legs extending substantially parallel to each other and cooperating with said upper and lower plates for supporting said stair support sub-assembly for pivotal movement.

13. The assembly of claim 12 including a mounting plate defining said mounting portion and a hinge plate defining said upper and lower legs, said hinge plate extending substantially perpendicular to said mounting plate.

14. The assembly of claim 13 wherein said vertically extending pin extends through said upper and lower plates and through said upper and lower legs in spaced relation to said mounting plate.

15. A compactor machine including a swing-away stair assembly, said stair assembly comprising:
    a movable stair body located adjacent a lateral side of said compactor machine, and including a step portion comprising a plurality of steps extending from a lower end to an upper end of said step portion; and
    structure for pivotably mounting said stair body to said compactor machine lateral side so as to permit said stair body to be pivoted through an arc of movement greater than 120° between first and second positions located on opposing sides of a wheel of said compactor machine.

16. The compactor machine of claim 15 wherein said structure comprises:
    a stair support sub-assembly rigidly attached to said movable stair body;
    a pivot mount sub-assembly rigidly attached adjacent said lateral side of said machine;
    a hinge member connecting said stair support sub-assembly to said pivot mount sub-assembly for pivotal movement about a vertically extending pivot axis whereby said movable stair body is pivotably movable through approximately 180° of movement about said vertically extending pivot axis from an operational position to an access position.

17. The compactor machine of claim 15 wherein said stair body extends substantially parallel to said lateral side when said stair body is in both said first position and said second position.

18. A swing-away stair assembly adapted to be coupled to a work machine, said stair assembly comprising:
   a movable stair body located adjacent a lateral side of a work machine, and including a step portion comprising a plurality of steps extending from a lower end to an upper end of said step portion;
   a stair support sub-assembly rigidly attached to said movable stair body;
   a pivot mount sub-assembly rigidly attached adjacent said lateral side of said machine;
   a hinge member connecting said stair support sub-assembly to said pivot mount sub-assembly for pivotal movement about a substantially vertically extending pivot axis located between front and rear wheels of said machine whereby said moveable stair body is pivotally movable about said vertically extending pivot axis from a first position to a second position; and
   wherein said stair body extends substantially parallel to said lateral side when said stair body is in both said first position and said second position.

19. The stair assembly of claim 18 wherein said stair body extends over one of said rear wheels of said machine when said stair body is in said first position.

20. The stair assembly of claim 18 wherein said stair body is pivotally movable about said vertically extending pivot axis through an arc of movement greater than approximately 120° from said first position to said second position.

* * * * *